Aug. 20, 1968  J. G. HEARD ET AL  3,398,304
ROTATING MACHINERY

Filed Feb. 15, 1965  2 Sheets-Sheet 1

# United States Patent Office 3,398,304
Patented Aug. 20, 1968

3,398,304
ROTATING MACHINERY
Jeffery Gerald Heard and Peter Michael Joseph Davies, Stafford, England, assignors to The English Electric Company Limited, London, England, a British company
Filed Feb. 15, 1965, Ser. No. 432,743
Claims priority, application Great Britain, Feb. 28, 1964, 8,329/64
1 Claim. (Cl. 310—61)

ABSTRACT OF THE DISCLOSURE

This invention relates to a dynamo electric machine in which a cooling liquid is pumped into and through the machine rotor to be exhausted through an outlet path which includes an axial duct and radial ducts in a shaft portion of the rotor. When the rotor is rotated, the radial ducts could pump liquid from the rotor at a greater rate than that at which it is being pumped into the rotor. The present invention discloses the use of restrictor means at the inner ends of the radial ducts which prevent these ducts from running full of liquid thereby to prevent them from having any pumping effect.

---

This invention relates to a dynamo electric machine having a liquid cooled rotor.

More particularly, the invention relates to a dynamo electric machine in which a cooling liquid is pumped into and through the rotor to be exhausted through an outlet path which includes an axial duct and radial ducts in a shaft portion of the rotor.

According to one feature of the invention liquid employed in a machine having a rotatable member is exhausted from the rotatable member through an outlet path which includes one or more radial or substantially radial ducts in the rotatable member, the outlet path including restrictor means for restricting the flow of the liquid within the or each such duct, so that the duct or ducts have substantially no pumping effect on the liquid when the rotatable member is rotated.

According to another feature of the invention the liquid outlet path includes a duct which is disposed axially of the rotatable member and the restrictor means is effective for causing liquid in the axial duct to maintain a predetermined minimum static pressure sufficient to prevent cavitation of the liquid therein.

Preferably the restrictor means comprises a separate restrictor unit for each radial or substantially radial duct.

Alternatively the restrictor means may comprise a single unit serving to restrict liquid flow into a number of ducts.

Such single unit may thus have a plurality of restrictor orifices arranged to restrict liquid flow into associated ducts.

Alternatively such single unit may have a single restrictor orifice for restricting fluid flow into a plurality of the ducts.

According to a further feature of the invention a collector box is disposed about the rotatable member for collecting liquid issuing therefrom.

Such collector box may include sealing means for preventing leakage of liquid around the rotatable member.

Such sealing means may comprise means for supplying gas under pressure about the rotatable member on either side of the or each radial or substantially radial duct.

According to yet a further feature of the invention liquid employed to cool the rotor of a dynamo electric machine is exhausted from the rotor in accordance with the arrangement described above.

In such a dynamo electric machine the outlet path may comprise an axial duct in the rotor body of the machine which communicates with one or more radial or substantially radial ducts in a shaft portion of the rotor body.

Figure 1:
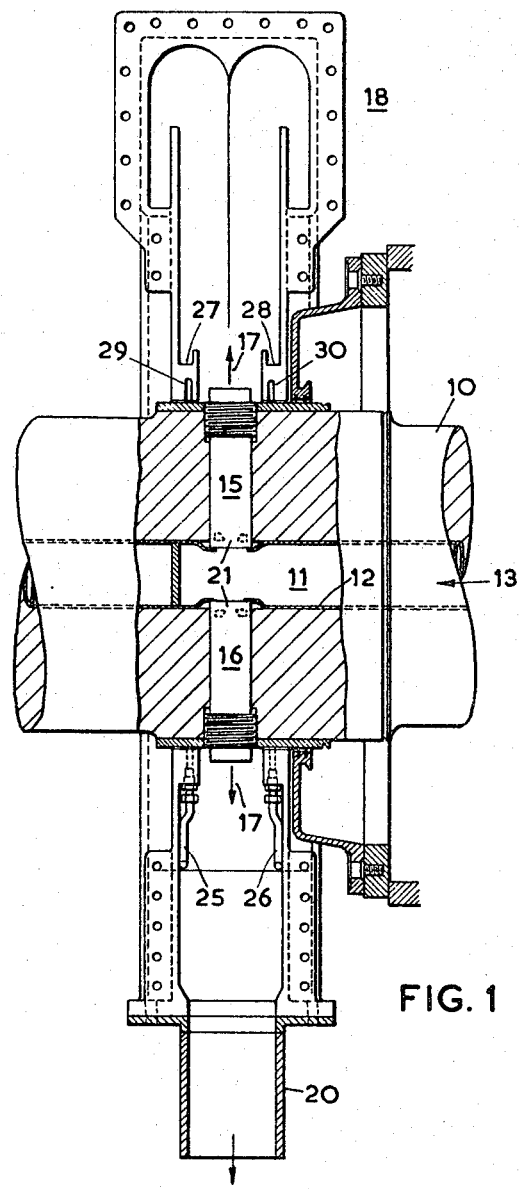
Figure 2:
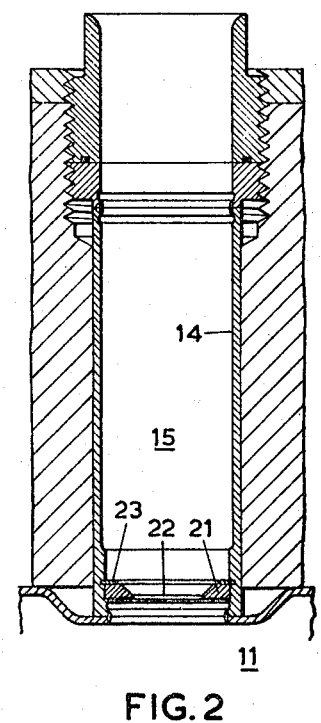
Figure 3:
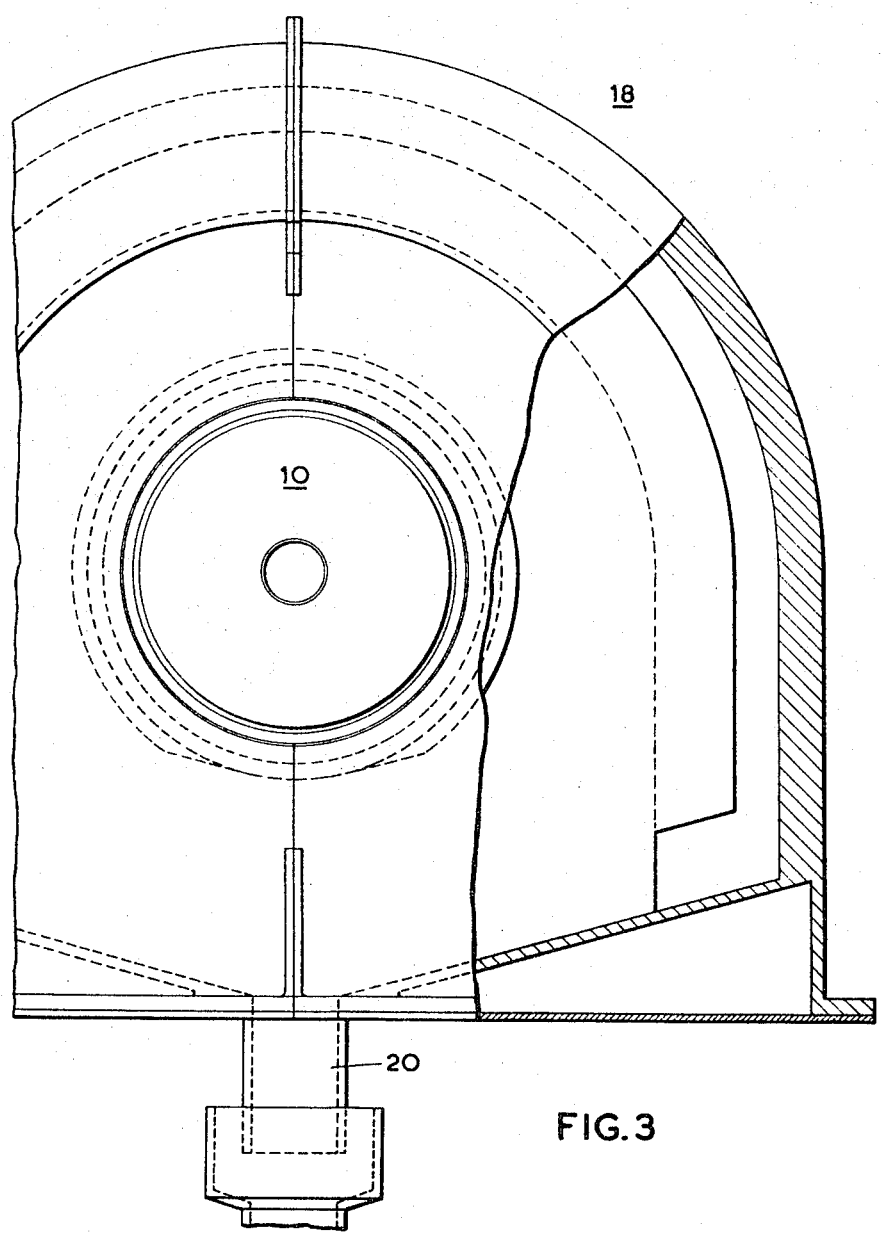

An outlet arrangement for exhausting cooling liquid from the rotor of a dynamo electric machine and embodying the invention will now be described, by way of example, with reference to the accompanying diagrammatic drawings, in which:

FIG. 1 is a view, partly in cross section of the shaft-end of the rotor at which the liquid is exhausted, FIG. 2 shows a detail of FIG. 1, and FIG. 3 is an end view of the arrangement shown in FIG. 1.

In FIG. 1 the rotor shaft which is generally indicated at 10 has an axial duct 11 lined with a corrosion resistant liner 12 and cooling liquid from the rotor passes through the duct 11 in the direction of the arrow 13 to be exhausted from the duct 11 through two radial ducts 15 and 16.

Liquid which is initially pumped into the rotor finally emerges from the ducts 15 and 16 in the direction of the arrows 17 and passes into a collector box generally indicated at 18 from where it flows out of the collector box at an outlet 20.

In order to prevent liquid leakage along the shaft from the collector box 18 a sealing arrangement is provided in which air or any other suitable gas is fed through pipes 25 and 26 to seals indicated generally at 27 and 28 and which surround the rotor shaft 10. This air or gas has to be at a pressure in excess of that in the collector box 18. These seals have respective annular chambers 29 and 30 to which the compressed air is supplied to prevent escape of liquid from the collector box along the shaft 10.

As is known ducts such as the radial ducts 15 and 16 when conveying liquid in a rotating body will develop a pumping pressure and the ducts 15 and 16 shown in the drawings and as applied to a practical embodiment of the invention could have a potential pumping power of several atmospheres during rotation of the rotor. With cooling liquid being pumped into the rotor of the machine to pass therethrough it is clear that conditions might arise in which the two radial ducts would tend to pump out the liquid from the machine at a greater rate than it was necessary or desirable for it to enter the machine with the result that the pressure in the axial duct 11 would decrease and damage would be caused by cavitation effects in the fluid.

In order to prevent this happening the pumping effect of the two ducts 15 and 16 is substantially suppressed by restrictor means 21 fitted into the ducts at the point where they join the axial duct 11, as is more fully shown in FIG. 2.

In FIG. 2 the duct 15 is shown in more detail and includes a corrosion resistant liner 14 and at the point where the duct joins the axial duct 11 the restrictor means 21 is held in position by a retaining ring 23.

The restrictor means 21 has therein an orifice 22 which restricts the flow of liquid from the duct 11 into the duct 15 thereby preventing the duct from running full and generating a full pumping head.

In order to prevent cavitation of the liquid in the axial duct 11 it is necessary that the restrictor means should be such as to allow the liquid in this duct to maintain a suitable static pressure.

FIG. 3 shows the general construction and external shape of the collector box 18.

Whilst the invention has been described in relation to a pair of radial ducts 15 and 16 more than two of such ducts could be used and these ducts need not be radial but could be "substantially radial," that is at an angle to the radius of the shaft. Further the duct or ducts need not be at a right angle to the axis of the shaft as shown in the drawings but could be at an angle in this respect also.

In a modification of the invention the separate restrictor unit situated at the end of each duct, is replaced by a single unit positioned within the axial duct 11 and having orifices aligned with the respective radial ducts. Alternatively the restrictor means could comprise a single unit within the axial duct 11 having therein a single orifice for restricting the flow of liquid into the radial ducts. Although the invention has been particularly described in relation to its use with a dynamo electric machine it could be applied to any machinery employing a liquid in a rotating member of the machine.

What we claim as our invention and desire to secure by Letters Patent is:

1. A dynamo electric machine having a liquid cooled rotor in which cooling liquid is pumped into the rotor to be exhausted through an outlet path in a shaft portion of the rotor, said outlet path including an axial duct in the shaft portion and radial ducts which communicate with the axial duct and extend therefrom to the outer periphery of the shaft portion, each radial duct being provided with liquid flow restrictor means disposed at the inner end thereof adjacent the axial duct for restricting the flow of liquid into and within the duct, whereby when the rotor is in operation each radial duct is prevented from running full of cooling liquid so that the ducts have no, or substantially no pumping effect on the liquid, and whereby the liquid in the axial duct is caused to maintain a static pressure sufficient to prevent cavitation of liquid threrein.

References Cited

UNITED STATES PATENTS

| | | | |
|---|---|---|---|
| 2,381,122 | 8/1945 | Fechheimer | 310—61 |
| 2,527,878 | 10/1950 | Fechheimer | 310—54 |
| 3,049,633 | 8/1962 | Cain | 310—54 |
| 3,267,868 | 8/1966 | Page | 103—87 |

FOREIGN PATENTS 851,408  10/1960  Great Britain.

MILTON O. HIRSHFIELD, *Primary Examiner.*

R. W. TEMPLETON, *Assistant Examiner.*